United States Patent [19]

Twist et al.

[11] Patent Number: 4,919,372
[45] Date of Patent: Apr. 24, 1990

[54] TRANSIT FOR CABLES AND PIPES

[75] Inventors: Michael Twist; Alan Platt, both of Manchester, England

[73] Assignee: Hawke Cable Glands Limited, England

[21] Appl. No.: 289,448

[22] Filed: Dec. 23, 1988

Related U.S. Application Data

[63] Continuation of Ser. No. 11,588, Feb. 6, 1987, abandoned.

[30] Foreign Application Priority Data

Feb. 11, 1986 [GB] United Kingdom ................ 863368

[51] Int. Cl.[5] ........................... H02G 3/28; F16L 5/00
[52] U.S. Cl. .................................... 248/56; 248/68.1; 174/48; 174/156
[58] Field of Search ............. 248/56, 68.1; 174/65 R, 174/65 G, 65 SS, 177 R, 48, 153 G, 155, 157

[56] References Cited

U.S. PATENT DOCUMENTS

| | | | |
|---|---|---|---|
| 1,133,976 | 3/1915 | Kraus | 248/68.1 |
| 1,697,814 | 1/1929 | Forbes | 248/56 |
| 2,732,226 | 1/1956 | Brattberg | 248/56 X |
| 3,458,163 | 7/1969 | Egerton-Smith | 248/68.1 X |
| 3,742,119 | 6/1973 | Newman | 248/68.1 X |
| 3,856,244 | 12/1974 | Menshen | 248/68.1 X |
| 4,117,998 | 10/1978 | Notoya | 174/153 G X |
| 4,358,632 | 11/1982 | Buch | 248/56 X |
| 4,361,721 | 11/1982 | Massey | 174/65 G X |
| 4,640,984 | 2/1987 | Kalbfeld | 174/153 G X |
| 4,702,444 | 10/1987 | Beele | 248/56 |

FOREIGN PATENT DOCUMENTS 217276 11/1967 Sweden ........................... 248/68.1

Primary Examiner—Alvin C. Chin-Shue
Attorney, Agent, or Firm—Larson and Taylor

[57] ABSTRACT

The invention concerns a lead-through transit for cables 3 or pipes of the kind having a frame 1 of the opening 2 is filled by a series of modular resilient lead-through blocks 4 and blank blocks 5 arranged in rows separated by stayplates 6 with a compression and packer assembly 7 clamping and holding the blocks 4,5 and cables 3 in sealed engagement. The lead-through blocks 4 comprise two complementary half-blocks 40 that provide, when assembled together around a cable, a passageway 41 for the cable. Each half-block 40 has a series of axially spaced semi-annular lands 42 separated by recesses 43. The lands 42 provide axially spaced sealing faces for engagement with the cable while the recesses 43 enable resilient deformation of the block to accommodate variations in cable size. To assist in such resilient conformation of the half-blocks 40, it is preferred that the half-block has recesses 44 formed on the outer faces that are aligned with the lands 42. Various arrangements of the lands 42 and recesses 43 or 44 in the resilient conformable lead-through blocks are described to provide the advantage of reducing the numbers of blocks required for service and installation requirements.

18 Claims, 5 Drawing Sheets

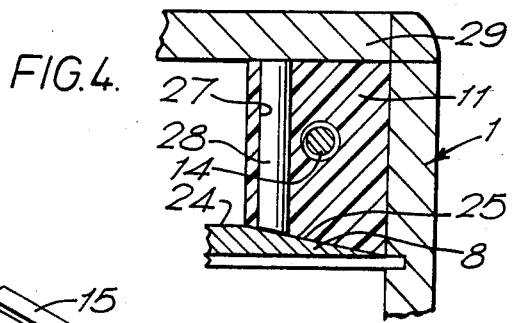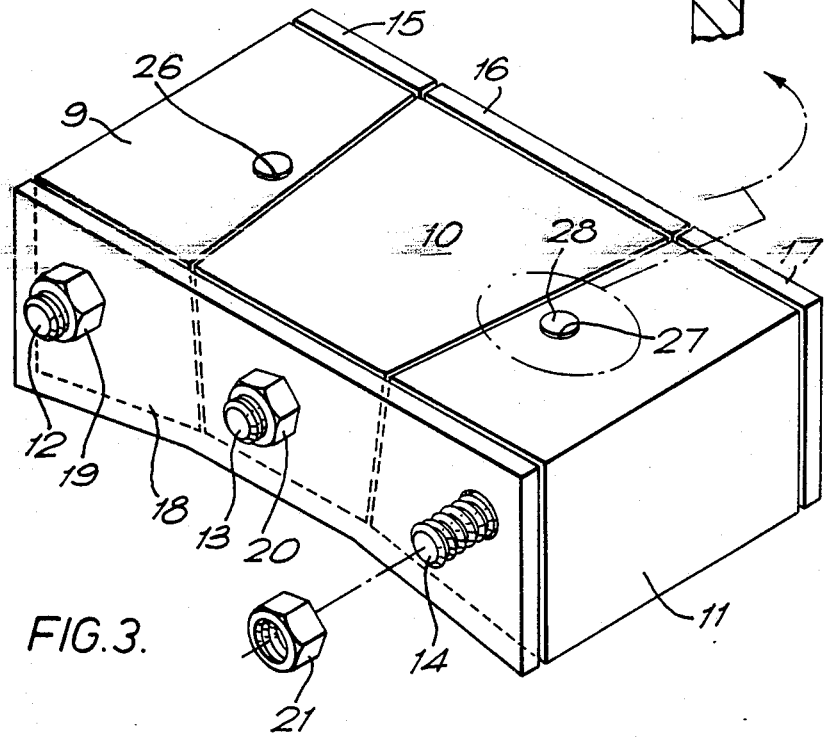

TRANSIT FOR CABLES AND PIPES

This is a continuation of application Ser. No. 011,588, filed Feb. 6, 1987, now abandoned.

This invention relates to a transit providing a lead-through for electric cables or pipes that are required to extend through an opening in a wall, bulkhead, partition or the like. This invention concerns certain improvements in a particular kind of transit as hereinafter defined and which is for use with cables, wires, pipes or tubes or the like elongate elements commonly used in an installation for conducting electricity, service commodities such as gas, oil or water, or enclosing such service lines. For convenience herein, the term "cable" is used and should be interpreted in the context to include all such aforesaid elongate elements.

This invention is particularly concerned with a transit of the kind now defined as comprising a rectangular metal frame defining an opening through which the cables are to extend, a series of sets of modular blocks for assembly in rows within the frame opening, the blocks being adapted for surrounding each cable or for blanking off a modular space, and a compression and packer assembly for mounting in the frame opening to clamp the assembled blocks together and around each cable with the compression and packer assembly completing filling of the frame opening.

Such defined kind of transit for cables is well known and is disclosed in Patent Specification GB No. 1,049,621.

Typically, transits of the defined kind are used in a wide range of applications and are installed in various environments including hazardous and have to meet specific regulations for fire-proof or flame-proof or gas-tight installations. Usually, a transit has to be assembled on site and often the working conditions at the installation site are difficult in many respects, such as: access and location; the numbers, types and sizes of cable; limited working space and lack of access to both inlet and exit sides of the lead-through; and, ambient temperature, weather and environmental conditions.

Conventionally in transits of the defined kind, in each series set of the modular blocks, each block is of square section and has a length substantially the same as the depth of the metal frame into which the blocks are assembled in an array of superimposed rows. Each block in a set of blocks has the same external dimensions and a plurality of blocks from one set will completely fill one row across the inside of the frame. To provide blanks at locations in a row where no lead-through is required, each set includes solid blank blocks for assembly in the row. For a cable lead-through, the blocks have a through hole of a diameter corresponding to the diameter of the cable to be surrounded by the block, and to facilitate fitting and assembly each such block is formed in two complementary halves with semi-cylindrical recesses that, when aligned, provide the lead-through hole in which the cable is seated.

As will be appreciated, in known transits for cables the series sets of blocks are several, each set having a different modular size. In each set, as well as the blank blocks, there have to be blocks that have through holes of many different diameters for a comprehensive wide range of cable sizes. For example, there may be eight modular sizes and hole diameters of from 4 mm to 100 mm are required sized to 1 mm intervals. This arrangement leads to many complications because of the numbers of blocks to be made and available on site for assembly when the cable transit is installed. In addition, sometimes the size of the cable for which lead-through blocks are specified and provided is found on site to be outside the given nominal diameter and cannot be properly seated into the half-blocks. Furthermore, cables are often not uniform in diameter along their length due to local deformation or manufacturing tolerances or defects.

In practice, the known cable transits of the defined kind have a sized lead-through blocks corresponding to each nominal cable size, and as a result extreme care is required to select the sized lead-through block equal to the diameter of the cable, and complications arise if the cables are not perfectly round and on-site measurements may be essential to obtain accurate fitting and sealing.

In attempts to overcome some practical problems, it has been necessary to provide packing strips which are of a specified thickness and which the fitter has to fix around the cable either to increase it's overall diameter to suit the lead-through block, or in some instances, to cover a local irregularity or defect. In some existing transit systems, the lead-through blocks are not made with holes sized to 1 mm intervals, and the use of such packing strips is an essential and integral part of the system. Many problems arise with such packing strips, particularly in view of the installation conditions and the manual dexterity required as well as the risk of contamination of the lead-through by dirt or pollutants when fixing the packing strip on site.

Thus, with existing systems, a very large number of lead-through blocks have to be made and handled and available on site to ensure that all possible permutations of cables can be accommodated through the cable transit and special intermediate steps using separate pieces of packing strip may be required on site.

Accordingly, it is a primary aim of this invention to provide a transit of the defined kind which is easy and simple to install with the number of component parts to be assembled at the installation site being less than in prior transit systems such as aforementioned.

It is an object of this invention to provide an improved transit of the defined kind and wherein the number of lead-through blocks required to accommodate a wide range of cable sizes are less than previously.

It is a further object of this invention to provide a cable transit of improved construction which can be used either with cables which are not of uniform diameter or which have a small variations in diameter along their axial length.

Other objectives and advantageous features of this invention will be referred to later herein.

According to this invention, we provide a transit of the defined kind for cables or the like characterised in that the lead-through blocks are for resilient conformation to a selected cable of a size within specific limits, the lead-through block comprising two complementary similar halves for assembly together to define the lead-through, the lead-through block having a through passage defined by a plurality of axially spaced cylindrical lands for engagement with the selected cable, a plurality of recesses extending intermediate each land being adapted to enable the lead-through block to conform resiliently within the specific limits to the selected cable to clamp and seal the lands to the cable when the cable transit is assembled.

By this invention, instead of providing one size of lead-through block for each size of cable, the same lead-through block can be employed for a range of cable sizes that are within the range of specific limits for resilient conformation of the lead-through block. Thus, the total numbers of lead-through blocks can be reduced compared with the conventional systems of accurately sized blocks for each cable size.

In addition, by this invention, it is possible to accommodate the common irregularities in the nominal diameter of the cable, in particular when nominal sized cables are found to be over-size or slightly oval. The use of separate packing strips is obviated.

Conveniently, the recesses intermediate each land may be of annular form. By this arrangement, the radial depth of each recess may be chosen with respect to the overall size of the block to ensure that the land portion is deformable uniformly around the periphery into the annular recesses.

According to another preferred feature of this invention, to further aid the conformability of the lead-through blocks, recesses may be formed in the outer walls of the lead-through block to locally reduce the wall thickness so that the block may be resiliently deformable.

These outer recesses may in formed as channel or U-shaped grooves extending in the side walls of each lead-through block and extending transversely to the axis of the lead-through.

The outer recesses may extend on two opposed side walls of the lead-through block or may extend around all four sides.

If outer recesses are formed in the lead-through blocks, it is preferred that the blank blocks should also have the same type of outer recess formed therein so as to have an outer configuration the same as the lead-through blocks.

Other features of this invention will now be described with reference to exemplary embodiments depicted in the accompanying drawings wherein:

FIG. 3 is an isometric view of part of the compression and packer assembly;

FIG. 4 is a detail sectional view of part of assembly shown in FIG. 3 and as indicated therein;

Figure 1:
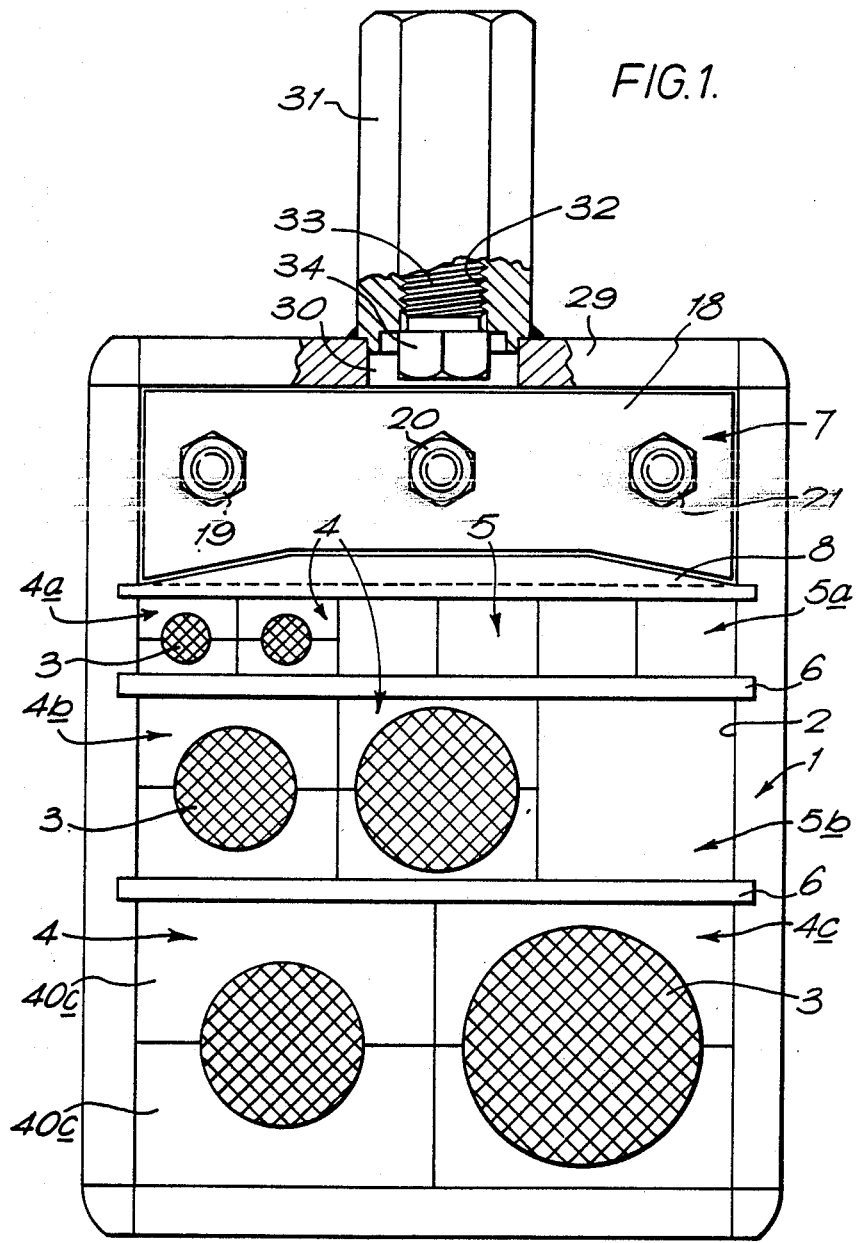
FIG. 1 is a front elevation of a cable transit according to this invention shown in the assembled position with cables in situ.
Figure 2:
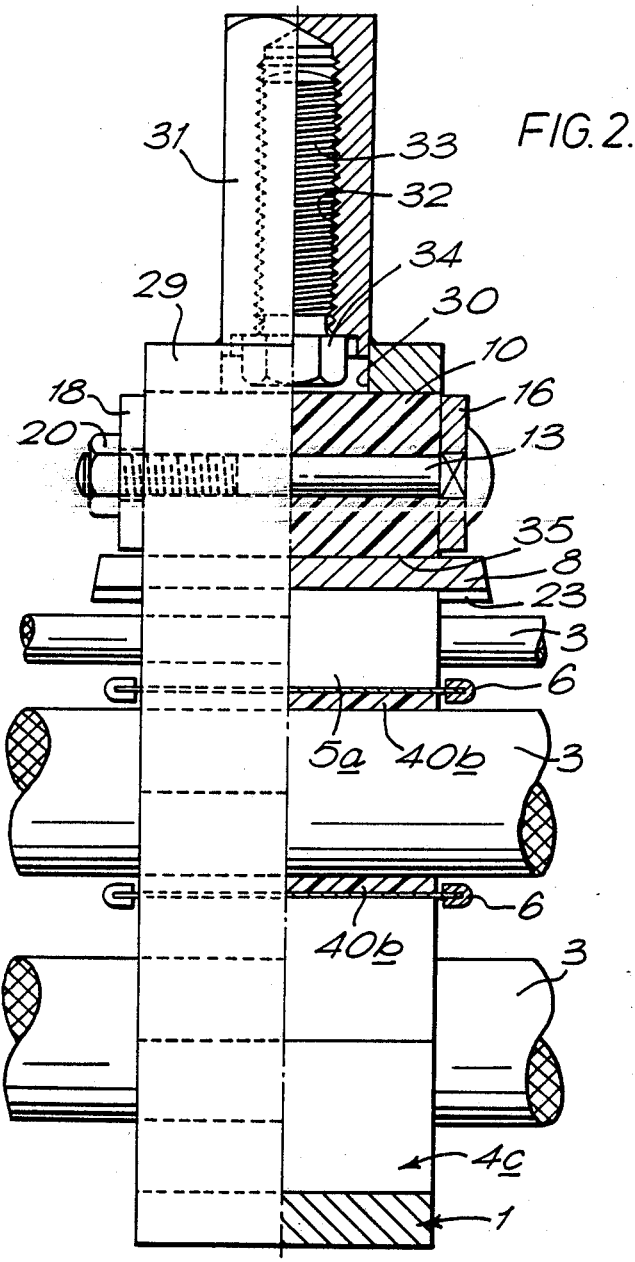
FIG. 2 is a partly sectioned side view of the cable transit shown in FIG. 1.

With reference to the drawings of FIGS. 1 and 2, the improved cable transit comprises a rectangular frame 1 defining an opening 2 through which cables 3 of different sizes extend. Each cable 3 is held within a lead-through block 4 whilst blank blocks 5 fill the modular spaces of the opening where no cable is present. In known manner, the frame is for mounting or support in an aperture in a bulkhead or partition or the like (not shown) and the numbers and sizes of cables may vary from one installation to another. For simplicity of explanation of this invention, only a small number of cables are depicted and the assembly is not as complex as found in practice where tens of cables may have to be accommodated and installed at the site location.

In this embodiment, there is depicted three series of modular sized sets of lead-through and blank blocks of which the sizes are designated by the suffixes a, b and c. Each series set has a common length corresponding substantially to the depth of the opening 2 and the frame 1. Each series set has blocks of substantially square section with the respective width and height dimensions of each set being selected to a common multiple so that a plurality of blocks of each set will complete a row or fill a modular space within the frame. Typical suitable modular dimensions are 90 mm, 60 mm and 30 mm for the square section blocks.

Each set of blocks is assembled in a row and to separate and support the assembled rows, stay plates 6 extend therebetween to locate on the marginal edges of the side walls of the frame 1.

In addition, the opening 2 is closed by a compression and packer assembly 7 which clamps and holds the rows of blocks in place and applies pressure to the blocks.

Figure 5:
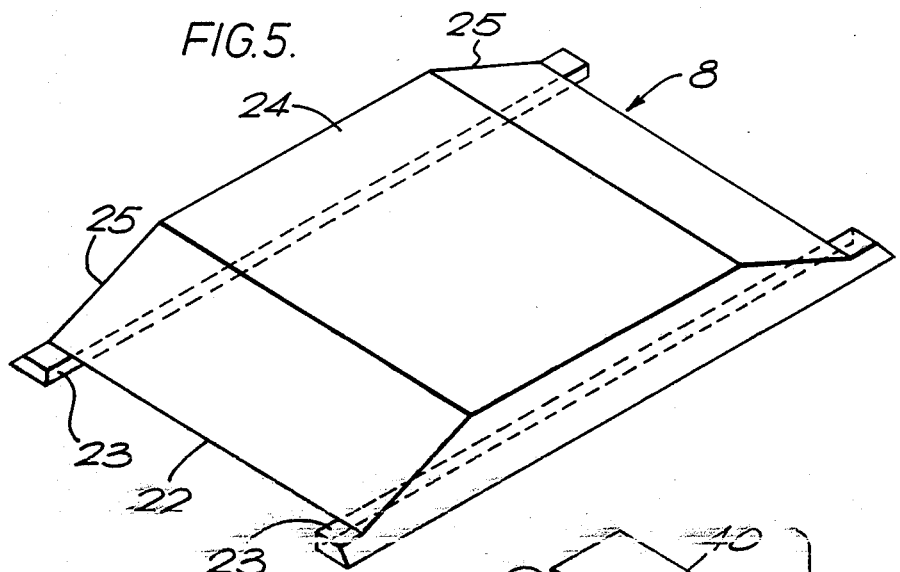
FIG. 5 is an isometric view of the compression plate of the compression and packer assembly.

With reference also to FIGS. 3, 4 and 5, the compression and packer assembly 7 comprises a pressure plate 8, three compression blocks 9, 10 and 11 each having a respective compressor stud 12, 13 and 14 extending therethrough. Each compression block 9, 10 and 11 has a respective rear support plate 15, 16 and 17 against which the rear head of each respective stud 12, 13 and 14 engages. Each stud 12, 13 and 14 extends through the respective block and through aligned openings in a front support plate 18 with respective nuts 19, 20 and 21 being in threaded engagement with the free end of the associated stud projecting through the front support plate 18.

The pressure plate 8 is a rigid body having a planar underside 22 for engagement with the upper faces of the top row of blocks 4a and 5a, and an edge flange 23 on each side of the plate 8 provides location ledges overlying the upper marginal edges of the blocks as well as providing outer end lug portions that extend outwardly and engage the outer faces of the sides of the frame 1. The topside of the plate 8 has a flat central portion 24 and opposed inclined portions 25.

Each of the compression blocks 9, 10 and 11 are made of a resilient material and the outer blocks 9 and 11 have respective through holes 26, 27 that extend transverse and spaced from the respective axes of the compression studs 12 and 14. As best shown in FIG. 4, a respective limit pin 28 is mounted in each through hole 26, 27 and this pin 28 is arranged to engage the inner face of the top of the frame 1 and the inclined portion of the pressure plate 8 so as to limit the degree of deformation of the blocks 9 and 11 when compression loading is applied to the blocks in the direction of the axis of the limit pins as later explained.

The upper wall 29 of the frame 1 is provided with a central clearance hole 30. A hexagonal shaped boss 31 is rigidly mounted on the upper wall 29 and projects therefrom aligned with the clearance hole 30. The boss has an internal blind threaded bore 32 and a compression bolt 33 is in threaded engagement within the bore 32 with the head 34 of the bolt 33 being accessible through the clearance hole 30 for rotation by a suitable tool. As should be appreciated, the bolt 34 can be unthreaded to extend into the void below the boss 31 when the central compression block 10 is not fitted, and the head 34 of the bolt will engage with the central portion 24 of the plate 8.

The compression blocks 9 and 11 are similar and have inner taper faces that lie adjacent to the opposed side faces of the central compression block 10. The central block 10 is generally in the form of a wedge with the opposed side faces diverging from the front of the block as well as converging towards each other towards the underside of the block to present a flat underside face 35 engaging the flat central portion 24 of the plate 8. The inner taper faces of the outer compression blocks 9 and 10 are complementary to the wedge faces of the central block 10. The underside faces of the compression blocks 9 and 10 are inclined and complementary to the respective inclined portions 25 of the plate 8.

Figure 6:
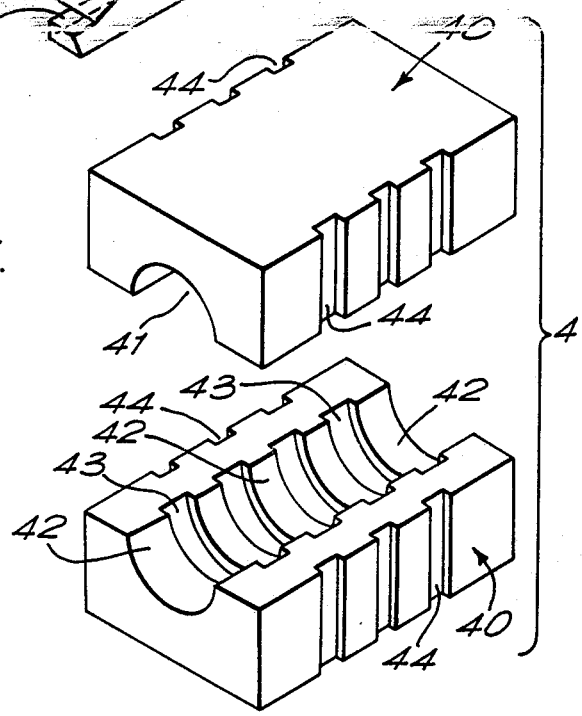
FIG. 6 is a detail isometric view of a lead-through block showing the two complementary half-blocks.

With reference also to FIG. 6, each lead-through block 4 is similar and comprises two complementary half-blocks 40 that are assembled together with the cable extending therebetween as shown in FIG. 1 and as is generally known in cable transits of the kind defined.

All of the modular blocks are formed from a resilient material which may be the same material as used for the compression blocks 9, 10 and 11.

Each half-block 40 provides a semi-cylindrical passageway 41 and the internal surface of the half-block is divided into semi-annular lands 42 which are separated by semi-annular recesses 43 which are concentric to the lands 42. The recesses 43 are spaced along the axial length of the half-block and preferably, as shown, each end of the passageway 41 is defined by a land 42 and not a recess 43. In short, if the number of the lands is "n", then the number of recesses is "n−1".

The lands 42 are arranged for engagement with the outer surface of a cable 3, and due to the resilient nature of the block material, on clamping of the half-blocks to and around the cable, each land 42 seals to the cable surface and irregularities of size or shape of the cable can be accommodated by local deformation of each land portion with the block material being squeezed or otherwise displaced into the separate voids provided by the recesses 43. Thus in the instance where a nominal size cable is selected with a nominal diameter bore for the passageway 41 in the lead-through, if the cable is oversize within the specific limit of conformation of the lead-through block, then the half-blocks can resiliently deform to conform to the cable. By this special feature, it is possible to provide lead-through blocks which can be used for more than one size of cable so as to minimise the numbers of blocks in each series set for a range of cable sizes.

As an additional feature in the lead-through blocks 4, each half-block 40 is provided in it's outer opposed side walls with channel-shaped recesses 44 that are spaced apart and lie in register opposed to each of the internal lands 42. The width of each recess in the axial direction is less than the corresponding axial width of the opposed land, and each of the outer recesses 44 assists in achieving the degree of resilient conformation of the lead-through block. It is preferred that the outer recesses 44 do not extend to the outer ends of each half-block, and this may be expressed shortly as "n−2" outer recesses where "n" is the number of lands.

Figure 7:
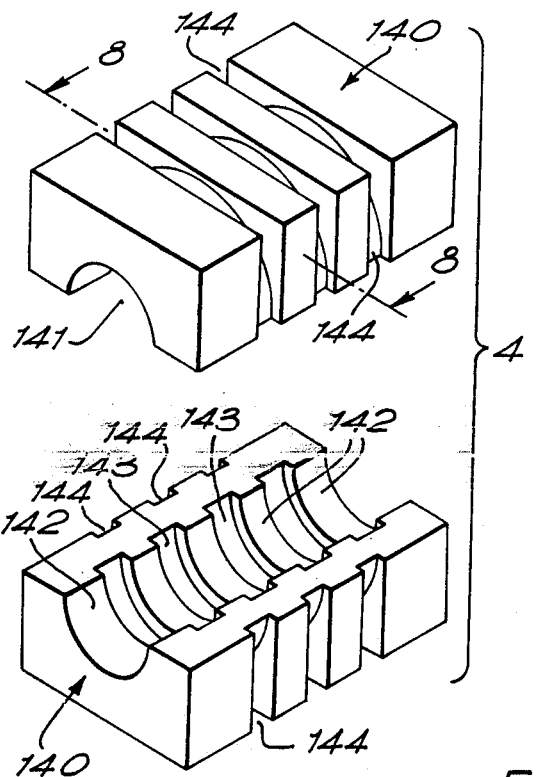
FIG. 7 is a detail isometric view of an alternative form of lead-through block showing the two complementary half-blocks.
Figure 8:
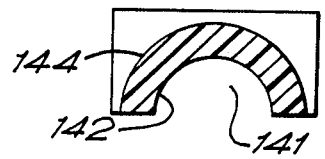
FIG. 8 is a detail section on line 8—8 as shown in FIG. 7.

With reference now to FIGS. 7 and 8, these depict an alternative form of modular lead-through block for this invention. As previously described, each lead-through block 4 has two complementary half-blocks 140 defining a semi-cylindrical passageway 141. The internal surface of the half-block is divided into semi-annular lands 142 which are separated by semi-annular recesses 143 which are concentric to the lands 142. In the same manner as previously described, the recesses 143 are spaced regularly along the axial length of the half-block and each end of the passageway 141 is defined by a land 142. The lands 142 are for engagement with the outer surface of the cable as aforedescribed.

In this alternative form of lead-through block, the outer part of each half-block is relieved by semi-annular recesses 144 which are concentric to the lands 142 and which are in diametric alignment therewith. The width (in the axial direction) of each recess 144 is preferably less than the width of the aligned land 142. As previously mentioned, the outer end of each half-block is not relieved by any such outer recess, and if the number of lands 142 is "n", then the number of inner recesses 143 is "n−1" and the number of outer recesses 144 is "n−2".

In this alternative form of lead-through block, the depth of each outer recess with respect to the outer side and bottom faces of the block will not be constant whereas the central portion of each land 143 will be backed up by a portion of block material of uniform thickness having regard to the concentric arrangement. Thus the relieved portions of the lead-through block both beside and behind each land will aid flexibility and conformation of the lead-through block when engaged with a cable.

With either form of the lead-through blocks as just described, it is desirable that in the modular series set of sized blocks, then the solid blank blocks 5 solid shall have the same form of outer recesses as the lead-through blocks so that the outward configuration of each block is the same in the modular series set. However, this is not essential, and the solid blank blocks 5 may have planar outer surfaces as they are not required to have such resilient conformation to suit a cable extending therethrough.

In the form of lead-through blocks as shown in FIG. 6, the upper and lower faces of the block may also be formed with channel-shaped recesses contiguous with the recesses 44 formed in the opposed side walls.

The recesses formed in the outer faces of the blocks must not provide a leak or flame path from one side of the assembled transit to the other, and the outer faces of the blocks must provide sealing engagement with each other and the inner face of the frame as well as with the stay plates 6 and the pressure plate 8. Thus the arrangement of recesses in the outer faces of the blocks are preferably complementary to provide sealing engagement at the respective interfaces.

The numbers of lands provided would normally be more than two and not more than ten, and the numbers of inner recesses and outer recesses would be varied in accordance with the "n" formula as given earlier.

As will be appreciated, the diameter of each passageway provided through the lead-through blocks will be selected for a nominal cable size, and a range of larger sizes to which the lead-through block can conform by the resilient deformation achieved on assembly and fitting as will now be described.

The cable transit as aforedescribed is assembled from the individual components, and firstly the frame 1 is located in the structure with the runs of cables 3 extending through the opening 2 of the frame 1. The fitter is presumed to have the selection of modular blocks 4 for each cable and a number of blanking blocks 5.

As depicted in FIG. 1, the largest lead-through blocks 4c are used in the lower row, and firstly the lower half-blocks 40c are set against the bottom inner wall of the frame 1 and each respective cable 3 is seated in the semi-cylindrical passageway and then the upper half-block 40c is seated on top to form the lead-through block closing over the cable and forming the lower row. The stay plate 6 is then inserted in place on top of the row of blocks with the marginal flanged edges of the stay plate 6 riding over the side edges of the frame 1 to locate the stay plate 6 in a similar manner as for the pressure plate 8. Preferably, the stay plate has a central web portion which is pierced or of mesh to prevent high rates of heat transfer from one side to the other of the cable transit when installed.

The fitter then selects the next cables 3 to be located in the lead-through blocks 4b for the next row and this row includes a blanking block 5. As for the first row, when the blocks 4b and block 5b are assembled another stay plate 6 is located over the row of blocks.

The third row of blocks 4a and 5a is then assembled in a similar manner, and all of the cable runs are enclosed by the selected lead-through blocks with the lower portion of the frame opening being filled by the rows of blocks and the stay plates 6.

Once this selective assembly has been completed by the fitter, it is then necessary to apply pressure to the assembled blocks and cables to clamp and seal the blocks together as well as to seal such lead-through blocks to the cable. In addition, the remainder of the opening in the frame 1 must be closed or filled so as to present a completely sealed assembly through which the cables extend. This next stage to complete the assembly is by the component parts of the compression and packer assembly as previously mentioned.

The pressure plate 8 is located over the third row of blocks and seated over the assembled array of blocks and cables. Due to the resilient nature of the blocks and the effect of the cables, pressure must be applied to the assembled blocks to compress the blocks around the cables to seal the lead-through blocks both around the cable and to clamp them together and against the side walls of the frame 1.

To apply this pressure, the compression bolt 33 is rotated to bring the head 34 into engagement with the flat central portion 24 of the plate 8 and on further rotation of the head 34 compressive forces are applied through the plate 8 to the assembled blocks.

Once the compressive forces are sufficient to leave a clearance space between the pressure plate 8 and the inner face of the top frame wall 29, the fitter can insert the two outer compression blocks 9 and 11 in the clearance space clear of the compression bolt which only extends to the centre of the clearance space and does not interfere with the fitting of the two side blocks 9 and 11.

Following the insertion of the two side compression blocks 9 and 11, the compression bolt 33 can be counter-rotated to return the bolt into the bore of the boss 31 leaving the central area over the pressure plate 8 free for insertion of the central wedge shaped compression block 10 between the two side blocks 9 and 11. The assembly of the rows of blocks and cables will continue to exert reactive forces on the pressure plate 8 tending to displace it towards the top wall of the frame, and thus tending to compress the blocks 9 and 11. To obviate the affect of these reactive forces, the limit pins 28 mounted in the compression blocks 9 and 11 restrict squeezing of the blocks.

Once the three compression blocks 9, 10 and 11 are received within the clearance, the front support plate 18 can be engaged over the free ends of each of the compressor studs 12, 13 and 14 and the respective nuts 19, 20 and 21 placed in threaded engagement. The fitter then tightens each of the nuts 19, 20 and 21 to apply compressive forces to the compression blocks so that the three blocks are brought into wedge clamping engagement with each other and brought into engagement with the support plate 18. On tightening of the nuts, each of the compression blocks 9, 10 and 11 is squeezed so as to cause resilient displacement of the block material in a direction transverse to the axis of each compressor stud thereby expanding the assembly both to fill the clearance opening between the pressure plate 8 and the frame 1 and to exert the required clamping pressure onto the assembly of blocks and cables beneath the pressure plate 8.

Accordingly, the compression and packer assembly 7 completes the filling of the opening 2 in the frame 1 whilst also applying the necessary forces to the assembled rows of blocks and cables to ensure that whole assembly is sealed together and securely located against displacement.

The forces applied to the assembled rows of the lead-through and blank blocks are sufficient to cause the lands of each lead-through block to be maintained in sealing engagement with the cable, and as previously described, each lead-through block is designed for use with more than one cable size and to be tolerant of local irregularities and non-uniform sections of cables.

As will be understood, the fitting of the cable transit arises in various environments, and the cable transit may be installed as described in the vertical position, but it may be installed horizontally where safe retention and ease of assembly of the blocks and other component parts is required. In addition, the fitter may have to work in elevated positions on ladders or in confined positions where the number of blocks with existing transits is excessive with one block for each size of cable. Thus, the cable transit of this invention provides many advantages over the prior art systems.

The exemplary embodiments described are simplified for an understanding of this invention, and the numbers and relative dimensions of the lands and inner and outer recesses may be varied to achieve the degree of conformability required. In addition, the inner and outer recesses may be of any suitable sectional shape or configuration.

The resilient material of which the lead-through and blanking blocks as well as the compression blocks are made can be of any suitable material which is flame-resistant, fire-resistant, water-resistant and resistant to effects of rodent attack, ageing, and temperature variations.

Throughout this description and the claims hereafter, reference is made to cables as this is the commonest form of use of transits through bulkheads, partitions or the like. However, the invented cable transit can be used and applied to pipes or conduits and the term "cable" is not intended to be a limitation to the application and use of the invention nor is the use of the term "cable" to be interpreted as a limitation to the scope of this invention.

What is claimed:

1. A lead-through transit for cables or pipes comprising:
   a rigid outer frame defining a rectangular opening having opposed frame side walls and opposed frame end walls,
   a plurality of modular blocks of resilient material arranged in rows within said opening,
   said rows extending between said frame side walls and partially filling said opening between said frame end walls,
   each said block being of rectangular section extending through said opening, said blocks comprising cable blocks which surround a respective cable or blanking blocks which blank off a modular space,
   said cable blocks comprising two complementary half-blocks defining a lead-through passageway extending normal to the plane of said opening, through which passageway the cable extends between entry and exit ends of said passageway,
   a compression means located between said frame side walls and completing filling of said opening between said frame end walls to compress and seal said blocks relative to one another and to said frame, and to compress and seal each cable block onto and around its respective cable,
   wherein each said cable block comprises:
   a plurality of axially spaced apart internal annular recesses, said recesses being spaced from said entry and exit ends of said passageway,
   a series of axially spaced apart internal land portions separated by said recesses, each said land portion having an axially extending sealing face and axially spaced opposed land side walls, the side walls, in the uncompressed state, extending generally radially from the bottoms of the recesses up to the sealing faces, and the sealing faces in the uncompressed state being cylindrical surfaces which extend axially for a distance greater than the height of their respective side walls, such that the land portions, viewed in an axial cross sectional plane are generally rectangular, each sealing face engaging a discrete outer surface of said cable, which discrete cable outer portions are spaced apart axially, by said recesses, from the other discrete outer cable surfaces which are engaged by other land portions, each said land portion engaging said cable around the entire circumference of its said discrete surface, the land portions being of a resilience, which, upon compression onto and around its respective cable, deforms into its adjacent recesses to form a high pressure fluid tight seal between itself and the cable (1) within a finite range of cable diameters received within that passageway and (2) in the presence of certain common irregularities in the nominal diameter of the cable.

2. A transit according to claim 1, wherein said internal annular recesses are concentric to said sealing faces of said land portion.

3. A transit according to claim 1 wherein recesses are formed in the outer walls of said cable block to reduce the wall thickness of said cable block locally to said land portions.

4. A transit according to claim 3 wherein said outer recesses of said cable block are in the form of channel or U-shaped grooves extending in the side walls of said cable block in a direction transverse to an axis of said lead-through passageway.

5. A transit according to claim 4 wherein said grooves extend on two opposed side walls of said cable block.

6. A transit according to claim 1 wherein recesses are formed in the outer walls of said lead-through block, said recesses being in the form of semi-annular recesses or grooves which are concentric to said lands and which are in diametric alignment with said lands.

7. A transit according to claim 1 wherein there are "n" said land portions and the number of said internal annular recesses is "n−1" where "n" is between 2 and 10.

8. A transit according to claim 7 wherein "n−2" outer recesses are formed in the outer walls of said cable blocks with said outer recesses being diametrically aligned with respective said land portions and reducing the wall thickness of said cable blocks locally to said land portions.

9. A transit according to claim 1 wherein said blanking blocks are solid and have outer recesses formed in the outer walls.

10. A transit according to claim 9 wherein each said blanking block is of square cross-section.

11. A transit according to claim 10 wherein said outer recesses of each said blanking block extend on two opposed side walls.

12. A transit according to claim 10 wherein said outer recesses extend on four side walls.

13. A transit according to claim 1 and further including corners at an intersection of said land side walls and associated said sealing faces.

14. A transit according to claim 13 and further including corners at an intersection of said land side walls and associated said recesses.

15. A transit according to claim 1 wherein said plurality of spaced apart annular recesses are uniformly spaced apart.

16. A transit according to claim 1 wherein said land side walls of each said land portion have a radial height between an associated said annular recess and an associated said sealing face, and wherein said radial heights of said land side walls are all equal to each other.

17. A transit according to claim 1 wherein each said annular recess has an axial length, and wherein said axial lengths of said annular recesses are all equal to each other.

18. A transit according to claim 1, wherein said land sealing faces are straight in the axial direction, forming a right cylindrical surface.

* * * * *